United States Patent [19]

Schmeisser

[11] Patent Number: 5,135,105
[45] Date of Patent: Aug. 4, 1992

[54] PROTECTIVE DISK CASE WITH STORAGE MEANS

[76] Inventor: Frederick M. Schmeisser, 17445 Wood, Melvindale, Mich. 48122

[21] Appl. No.: 529,491

[22] Filed: May 29, 1990

[51] Int. Cl.⁵ ............................................. B65D 85/30
[52] U.S. Cl. .................................. 206/309; 206/311; 206/313
[58] Field of Search ............... 206/444, 309, 310, 311, 206/312, 313; 40/340

[56] References Cited

U.S. PATENT DOCUMENTS

| | | | |
|---|---|---|---|
| 1,440,737 | 1/1923 | Jones | 206/312 |
| 2,344,919 | 3/1944 | Kelly | 206/62 |
| 3,207,318 | 9/1965 | Gilbert | 211/40 |
| 4,453,631 | 6/1984 | Mark | 206/313 |
| 4,630,385 | 12/1986 | Swim | 40/340 |
| 4,702,369 | 10/1987 | Philosophe | 206/312 |
| 4,863,031 | 9/1989 | Tanaka et al. | 206/444 |
| 4,875,578 | 10/1989 | Nehl | 206/309 |
| 4,875,743 | 10/1989 | Gelardi et al. | 312/13 |
| 4,899,875 | 2/1990 | Herr et al. | 206/313 |

Primary Examiner—Paul T. Sewell
Assistant Examiner—Thomas P. Hilliard
Attorney, Agent, or Firm—Lynn E. Cargill

[57] ABSTRACT

A protective disk case comprises a thin box having a rigid top shell and a rigid bottom shell which cooperatively fit together to define an enclosed area which is sized to receive a recording disk. The top and bottom shells are separatable so that the front and back side of the disk case are separatable into two parts. Furthermore, there is included a locking means and a hinge means for connecting and locking the top and bottom shells together. One embodiment describes a circular bevelled edge within the enclosed area for supporting the recording disk without having the sides of the disk contacting the inside of the protective disk case. A hook may be attached to the top of the protective disk case to allow hanging of the case from a support rod. Furthermore, there is disclosed a second, thin box having an open side to allow for insertion of the protective disk case to facilitate in the storage and handling of individual recording disks.

8 Claims, 3 Drawing Sheets

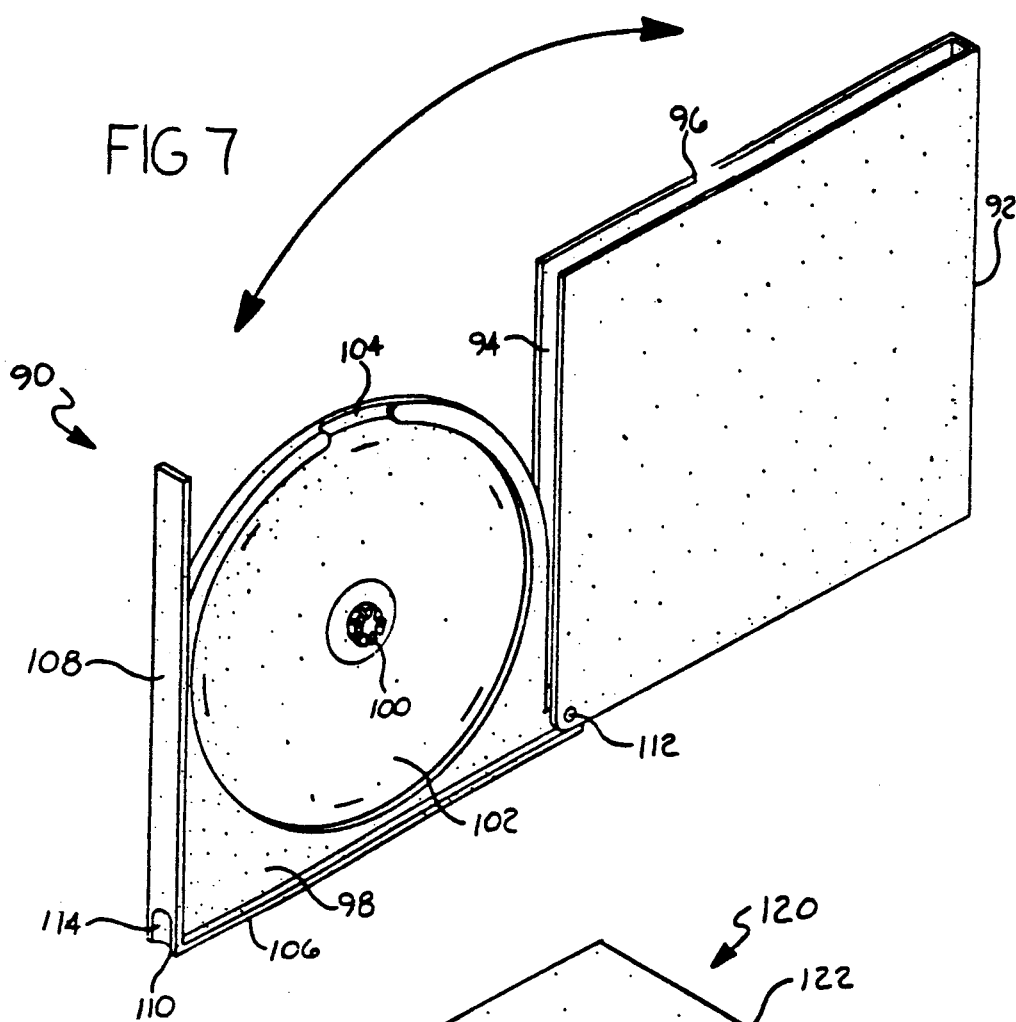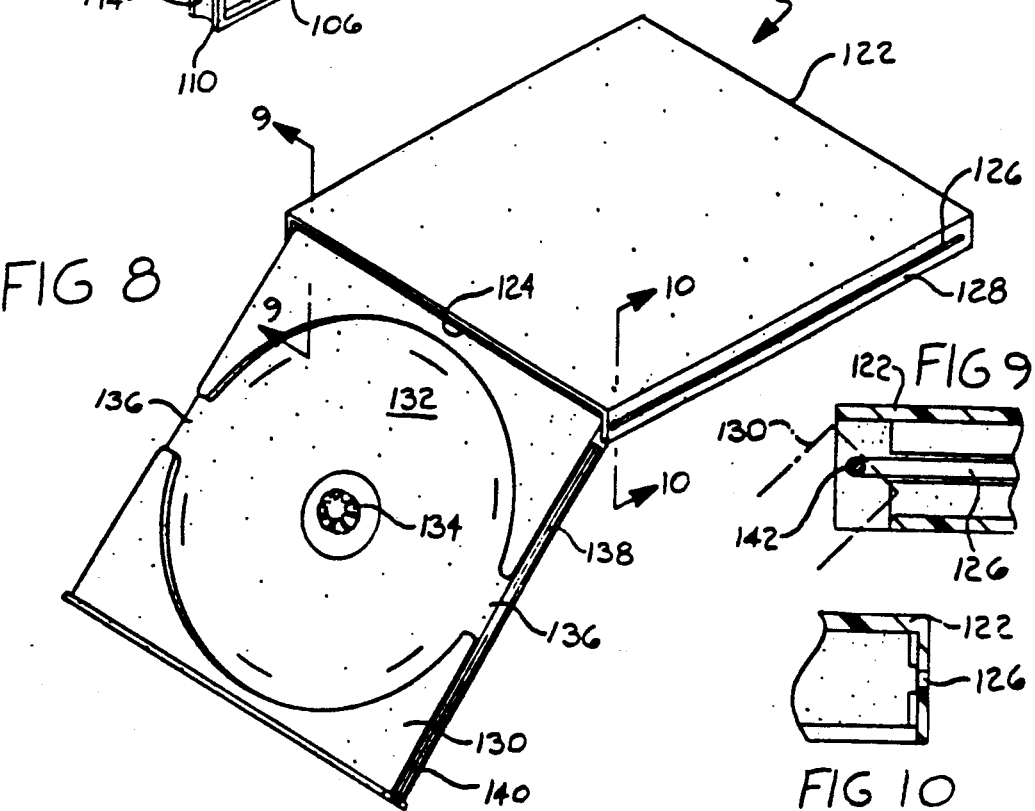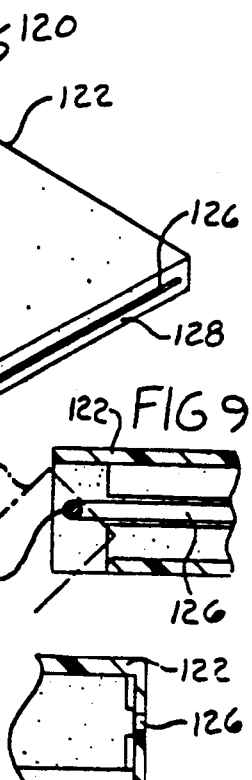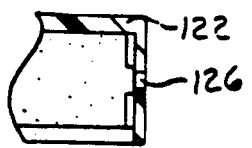

PROTECTIVE DISK CASE WITH STORAGE MEANS

TECHNICAL FIELD

This invention relates generally to protective cases for recording disks, such as compact disks, video disks, and phonograph albums.

BACKGROUND OF THE INVENTION

Typically, phonograph albums and video disks are stored in their accompanying jacket assembly which consists of a paper or plastic sleeve into which the album or disk is placed and a cardboard jacket into which the sleeve and album or disk are placed. These jacket assemblies have inherent problems in that (1) the stored recording disk can be scratched while placing the disk in the close-fitting paper or plastic sleeve, (2) the jackets are difficult to organize because they are so thin that the side labeling is difficult to read, (3) the jacket material deteriorates over time, (4) the recording disk contained in a jacket is vulnerable to breakage due to careless handling, as the jacket material is not of supporting strength, and (5) recording disks stored in the cardboard jackets have the potential for warping because they are not supported by a rigid support.

Compact disks are also commonly stored in their original containers which consists of rigid plastic boxes which open between the wide front and back panels. These containers have been found to be difficult to open and difficult to use. Examples of other previous attempts to store and protect recording disks from scratching and dust are described in the following patents.

U.S. Pat. No. 4,702,369 issued Oct. 27, 1987 to Philosophe discloses a storage container including a drawer-like receptacle and a pair of opposed, separable shell-like cover members for releasably supporting the drawer-like receptacle therewithin. The storage container may be stacked one upon the other in overlying fashion. The storage containers have means for attaching two storage containers together so as to prevent relative displacement of the storage containers stacked one upon the other in the four and aft and side-to-side direction.

U.S. Pat. No. 4,694,957 issued Sep. 22, 1987 to Ackeret discloses a container for storing flat recording media, such as compact disks, which has a housing and a plurality of media holders which can be moved between a storage position and an ejected position. The holders each receive a single disk and have a normally closed disk insertion slot which opens when the holder is moved to the ejected position. One embodiment of the Ackeret patent includes individual holders housed inside a housing which store disks vertically and which are pivoted about a pin in one corner of the housing.

U.S. Pat. No. 4,687,101 issued Aug. 18, 1987 to Barker, Sr. et al. discloses a protector/holder for a computer, video or phonograph disk which is in the form of a housing having spaced top and bottom wall surfaces, two opposed side walls and an enclosed bottom edge forming a three sided closed enclosure with an open top end. An upwardly extending and outwardly tapering V-shaped slot is formed interiorly within the housing at the bottom end of the housing to securely receive the bottom edge therein.

U.S. Pat. No. 4,627,531 issued Dec. 9, 1986 to Clemens discloses a recording disk enclosure having semi-rigid top and bottom portions with adjoining sides forming an enclosed space therebetween. An aperture sized to pass a recording disk therethrough is disposed through one side of the enclosure. A closure strip is disposed to cover the aperture in the closed position.

U.S. Pat. No. 4,428,483 issued Jan. 31, 1984 to Narita et al. discloses a disk accommodating case comprising a jacket having an opening portion at one end thereof, and a member for closing the opening portion of the jacket.

U.S. Pat. No. 4,084,694 issued Apr. 18, 1978 to Lainez et al. discloses a container for video-disks which includes a support for the disk in a protective envelope which is opened along one edge to allow the support to be inserted laterally into the envelope. In one embodiment disclosed in the patent, a detachable rear edging may be added to the support. The edging may, for example, be formed by a thin strip which is provided with a longitudinal slot which grips the edge of the support. The rear edging enables the support, which is intended for manual transfer, to be adapted to semi-automatic or automatic transfer.

U.S. Pat. No. 3,942,639 issued Mar. 9, 1976 to Cournoyer et al. discloses a guard device for storing a disk package comprising a jacket containing a flexible magnetic disk, the device being substantially rigid and having a front surface, a back surface, sides and a bottom. The device also preferably includes ribs to protect a pocket for the disk package as well as restraining ribs located at the bottom of the pocket.

Furthermore, U.S. Pat. No. 4,639,813 issued Jan. 27, 1987 discloses a cleaning apparatus consisting of a case formed to the same size and shape as those of the hard-cased floppy disks, a cleaning sheet formed to the same shape as that of the floppy disks magnetic disk rotatably installed in the case, and a cleaning liquid supplier provided to the case, the cleaning supplier being adapted to supply the cleaning liquid to the cleaning sheet.

It is a primary object of the present invention to provide a protective disk case which protects recording disks from the outside elements and potential damage during handling, which is easy to open and easy to close, and which is designed so that the recorded portion of the disk does not contact the case when placed therein. It is another object of the invention to provide a protective disk storage case which is easy to label and, therefore, organize, does not deteriorate, and keeps the stored recording disk from warping.

It is yet another object of the present invention to provide a protective disk storage assembly which allows two or more of the storage cases to be stacked together.

SUMMARY OF THE INVENTION

In accordance with the preferred embodiment of the invention, these and other objects and advantages are addressed as follows.

A protective disk case is disclosed which includes a thin box having a rigid top shell and a rigid bottom shell which fit together to define an enclosed area for receiving a recording disk. The top and bottom shells also form a front side and a back side, the front and back sides being relatively larger than any other side of the thin box for containing a recording disk, the top and bottom shells being separable and a line of separation so that the front and back sides of the thin box are each separable into two parts. The protective disk also includes a locking means near one end of the line of separation to lock the top and bottom shells together as well as a hinging means near the other end of the line of separation to hingedly connect the top and bottom shells together.

In another embodiment, a protective disk case further includes a hook attached to the top of the thin box to allow hanging of the protective disk case from a support rod.

In yet another embodiment, a protective disk case is disclosed which includes a thin box having a rigid top shell and a rigid bottom shell fitting together as in the first embodiment, however, also included is a circular bevelled edge within the enclosed area for supporting a recording disk without having the sides of the disk contacting the inside of the protective disk case.

In still another embodiment, a protective disk storage assembly is disclosed which includes a first thin box having a rigid top shell and a rigid bottom shell as in the embodiment of the present invention described hereinabove, and furthermore includes a second thin box having an open thin side to allow insertion of the first thin box therein. The second thin box being designed to closely fit around the first thin box.

Another embodiment of the storage assembly includes a first thin box and a rigid top shell, a rigid bottom shell, including the circular bevelled edge as described hereinabove, and further comprising a second thin box also having an open side for allowing insertion of the first thin box therein.

In still one more embodiment of the protective disk case of the present invention, there is furthermore described protective disk case having a thin box with a first open thin side and a second open thin side adjoining the first open thin side, and furthermore having a disk support which is sized to receive a recording disk thereon and furthermore sized to be inserted into the thin box through the first open thin side. In addition, a hinging means is located at a corner of the thin box to join the two open thin sides so that the disk support may be pivoted in and out of the thin box.

All of the above describes protective disk cases and storage assemblies may further include handles, notches, and other devices so that the fingers of the users may be utilized to pivot the disk support, or to easily open the protective disk case.

BRIEF DESCRIPTION OF THE DRAWINGS

The nature and extent of the present invention will be clear from the following detailed description of the particular embodiments thereof, taken in conjunction with the appendant drawings, in which:

FIG. 7 shows a perspective view of a protective disk case according to another embodiment of the invention;

FIG. 8 shows a perspective view of a protective disk case according to yet another embodiment of the invention;

FIG. 9 shows a cross-sectional view of a portion of FIG. 8 as taken along lines 9—9; and FIG. 10 shows a cross-sectional view of another portion of FIG. 8 as taken along lines 10—10.

DETAILED DESCRIPTION OF THE INVENTION

Figure 1:
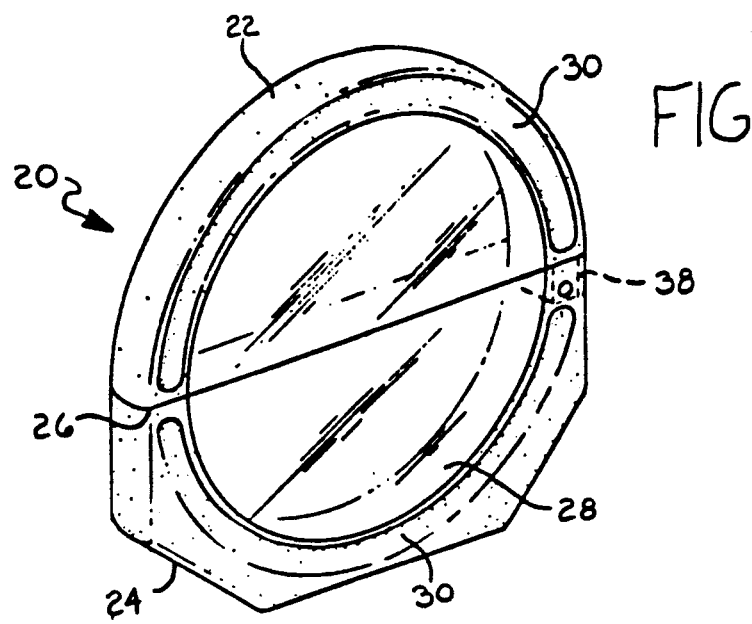
FIG. 1 shows a perspective view of a protective disk case according to a first embodiment of the present invention.

Referring first to FIG. 1, one embodiment of a protective disk case according to the invention is generally denoted by the numeral 20. Protective disk case 20 includes a thin box having rigid top shell 22 and rigid bottom shell 24 which are separable at line of separation 26. Protective disk case 20 has front side 28 and a back side (not shown), which sides are relatively larger than any other side on protective disk case 20. Line of separation 26 essentially divides protective disk case 20 in half so that the front and back sides are essentially each divided in half. Near the edges of the front and back sides are indentation areas 30 which are present to facilitate grasping of protective disk case 20.

Figure 2:
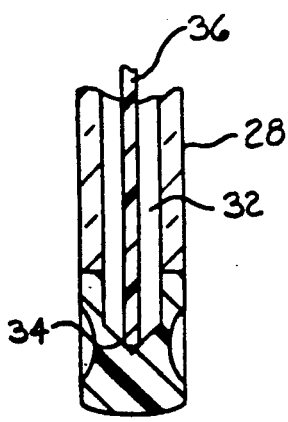
FIG. 2 illustrates the bevelled edge inside the protective disk case of FIG. 1.

The top and bottom shells together define an enclosed area therein sized to receive a recording disk. The enclosed area, designated by numeral 32 in FIG. 2, may be defined by circular bevelled edge 34 which is shown supporting recording disk 36 so that the sides of recording disk 36 do not contact the inside of protective disk case 20. Circular bevelled edge 34 provides 360° support of the recording disk to help prevent scratching and warping of the stored recording disk.

Figure 3:
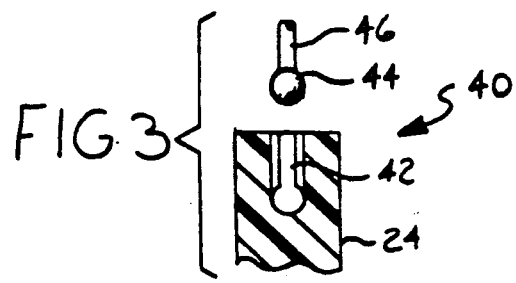
FIG. 3 shows an exploded view in partial cross section of one design for the locking means for the protective disk case of FIG. 1.

At one end of line of separation 26 is hinging means 38 to hingedly connect shells 22 and 24 together. At the other end of line of separation 26 is a locking means (not shown in FIG. 1). One design for a suitable locking means is shown in FIG. 3 and generally denoted by numeral 40. Locking means 40 includes opening 42 in bottom shell 24 shaped to snugly fit locking ball 44 which is attached to stem 46 which, in turn, is connected to top shell 22.

Figure 4:
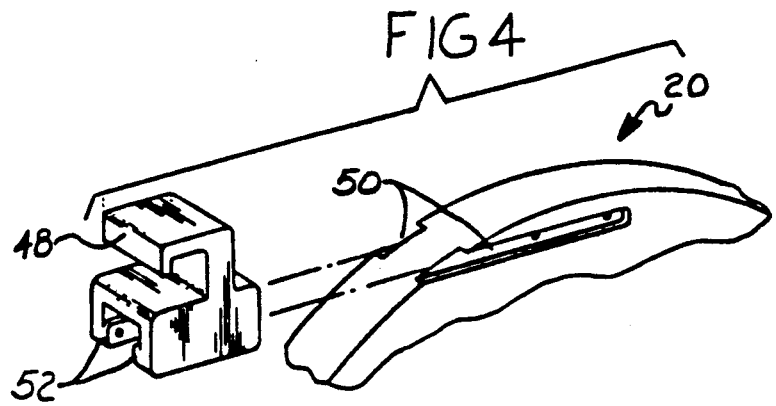
FIG. 4 shows an exploded perspective view of an optional hook to be attached to the protective disk case of FIG. 1.

FIG. 4 illustrates hook 48 which may be attached to protective disk case 20 so that protective disk case 20 may be hung from a support rod. Protective disk case 20 has indentures 50 therein which are designed so that appendages 52 of hook 48 may slide and lock into indentures 50.

Figure 5:
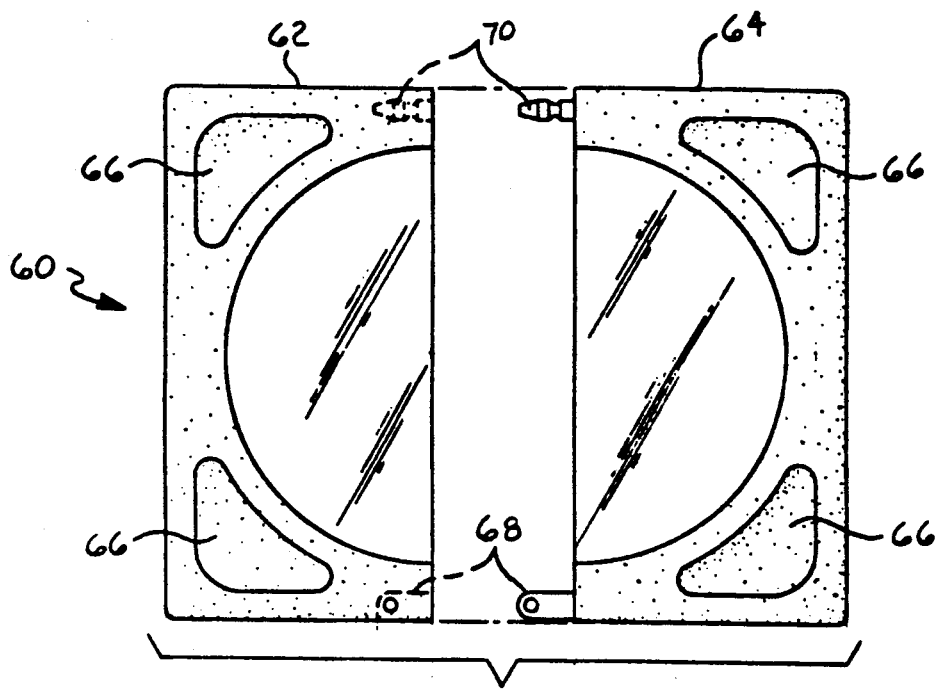
FIG. 5 shows a side elevational view of a protective disk case according to another embodiment of the invention, the case being shown partially unassembled.

Turning now to FIG. 5, an unassembled protective disk case similar to that shown in FIG. 1 is identified by numeral 60. Protective disk case 60 has two shells 62 and 64 which are separable. Protective disk case 60 also has indentation areas 66 thereon for easier grasping and is equipped with hinging means 68 and locking means 70.

Figure 6:
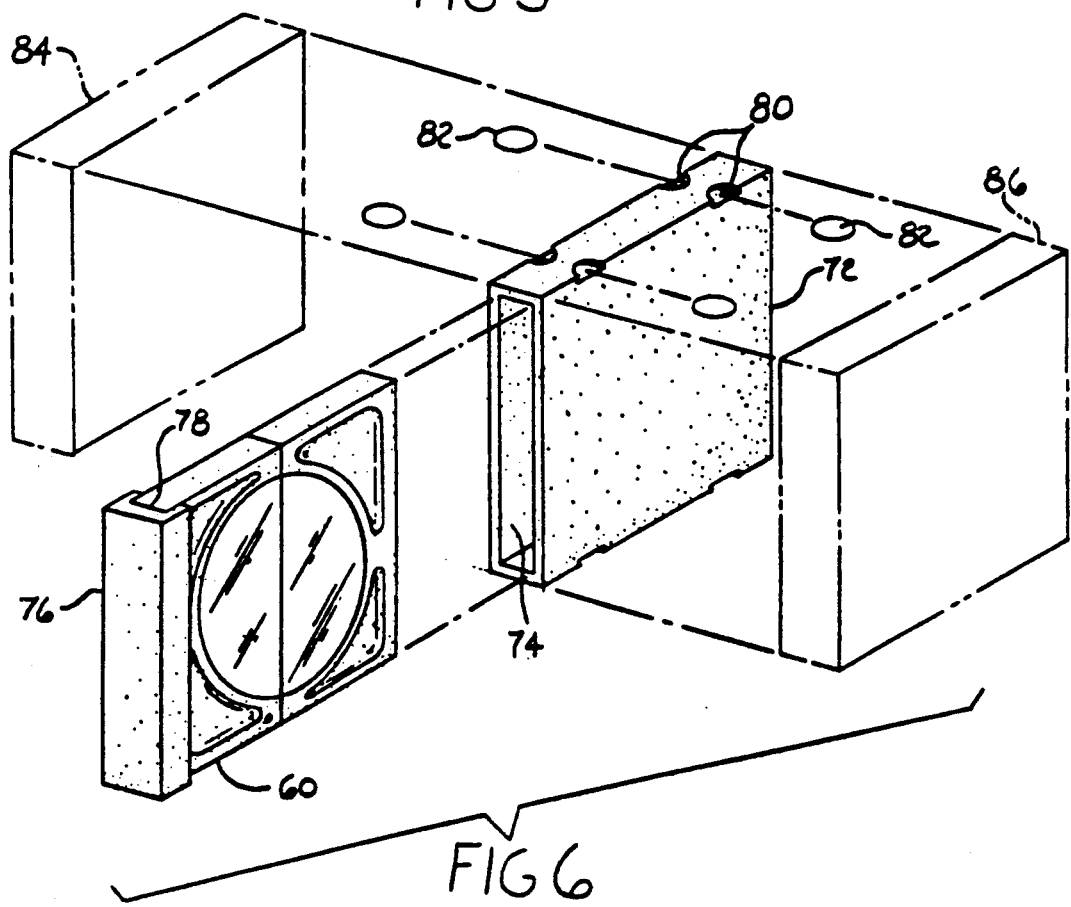
FIG. 6 illustrates an unassembled protective disk storage assembly according to the invention.

FIG. 6 illustrates a protective disk storage assembly which includes protective disk case 60 and protective disk case enclosure 72. Protective disk case enclosure 72 includes a thin box having open thin side 74, and protective disk case enclosure 72 is sized to enclose protective disk case 60. Protective disk case 60 is shown in FIG. 6 having handle edge 76 attached to a thin side thereof. Handle edge 76 is essentially a bar with elongated slot 78 therein which is sized to be press fit onto protective disk case 60 and facilitate handling of protective disk case 60, as well as provide sufficient area for labelling the protective disk case.

Protective disk case enclosure 72 has connection slots 80 on one or more thin side thereof. Inserts 82 are sized to be press fit into connection slots 80 and to each have a portion extend outwardly therefrom which may be press fit into a connection slot of an adjoining protective disk case enclosure. Two protective disk case enclosures are shown in phantom as 84 and 86. The connecting slots and inserts make up a form of connection means which allows more than one protective disk case enclosure to be stacked together.

The protective disk storage assembly may be designed and formed of materials of sufficient strength so that, when several of the protective disk case enclosures are connected together, the connected plurality of protective disk case enclosures is strong enough to hold a stereo or other heavy item on top. The protective disk storage assembly of this invention is designed so that one may remove a recording disk without disrupting or separating the connected protective disk case enclosures. The protective disk case enclosure may be designed so that it is large enough to contain not only a protective disk case but also any cardboard packaging which is included with the recording disk when purchased.

To store a recording disk in the protective disk storage assembly of FIG. 6, first protective disk case 60 is removed from protective disk case enclosure 72. Then protective disk case 60 is opened at locking means 70, the recording disk is placed inside protective disk case 60, protective disk case 60 is locked closed, and protective disk case 60 is then inserted into protective disk case enclosure 72. To remove a recording disk from protective disk case 60, protective disk case 60 is opened and one merely needs to insert a finger into the center hole of the recording disk to grasp the recording disk and remove it.

Turning now to FIG. 7, another protective disk case embodiment according to the invention is shown generally as numeral 90. Protective disk case 90 includes thin box 92 having open thin sides 94 and 96. Protective disk case 90 also includes disk support 98 which has holding means 100 for positively holding a recording disk thereon so that the recording disk will remain on disk support 98 regardless of the position in which disk support 98 is held. Holding means 100 is shown as an expandable button which is well known in the art of disk cases.

Surface 102 is where a supported recording disk rests while the center hole of the recording disk is snapped onto holding means 100. At the top edge of disk support 98 is shown notch 104 which is present to allow the user to more easily grasp a supported recording disk for removal.

Disk support 98 also includes two flat rectangular sides 106 and 108 which are joined at corner 110. Disk support 98 is hinged to thin box 92 at hinge 112. Flat rectangular sides 106 and 108 are sized and positioned so that, when disk support 98 is pivoted into thin box 92, flat rectangular sides 106 and 108 close open thin sides 94 and 96, respectively.

Disk support 98 also has finger slot 114 on flat rectangular side 108 near corner 110 to allow a user to more easily pivot disk support 98 out of thin box 92.

During use of protective disk case 90, a recording disk is stored by first pivoting disk support 98 out of thin box 92. The recording disk is then placed on surface 102 over holding means 100. Once the recording disk is securely in place, disk support 98 is pivoted back into thin box 92.

Yet another embodiment of the invention is shown in FIG. 8 as protective disk case 120 which includes thin box 122 having open thin side 124 and open elongated groove 126 in thin side 128. Protective disk case 120 also includes disk support 130 which has support surface 132, holding means 134 of the same type as that shown in FIG. 7, notches 136, and elongated rail 138 along thin side 140. Elongated rail 140 is sized to slidingly fit in elongated groove 126 of thin box 122. Elongated rail 140 and elongated groove 126 form the means for sliding disk support 130 in and out of thin box 122. A second elongated rail and elongated groove (126') are included on the opposite side of protective disk case 120. Protective disk case 120 also includes hinging means 142 connecting thin box 122 and disk support 130 when disk support 130 is substantially slid out of thin box 122. Hinging means 142 is shown in FIG. 9 as a rod which extends between the elongated grooves. FIG. 10 shows another view of the second elongated groove 26 on thin box 122.

To store a recording disk in protective disk case 120, disk support 130 is slid out of thin box 122 until hinging means 142 stops the travel of disk support 130. A recording disk is then placed on support surface 132 and attached with holding means 134. Then disk support 130 is slid back into thin box 122. To remove a recording disk, disk support 130 is slid out of thin box 122, and the user grasps the recording disk by its edges near notches 136 and lifts the recording disk from support surface 132.

The protective disk cases and protective disk case enclosures of this invention are formed of a rigid material, such as polystyrene, nylon, polystyrene/polycarbonate, or acrylic. The material of construction is chosen for its strength and durability and is preferably clear for easy inspection of the enclosed disk. Components to make the protective disk cases and protective disk case enclosures may be made by any suitable technique, such as by injection molding.

Thus, there is provided in accordance with the present invention several embodiments of a protective disk case which will add life to a recording disk because it is formed of long-lasting, sturdy materials which protect the disk from the outside elements and possible damage during handling. Furthermore, the protective disk cases of this invention (1) are easy to open and easy to close, and (2) are designed so that the disk is fully supported therein and the recorded portion of the disk does not contact the protective disk case when placed therein. The invention also provides a protective disk storage assembly which allows more than one protective disk case to be connected together for stacking or for vertical arrangements.

While my invention has been described in terms of several specific embodiments, it must be appreciated that other embodiments could readily be adapted by one skilled in the art. Accordingly, the scope of my invention is to be limited only by the following claims.

I claim:

1. A protective disk case, comprising:
    a thin box having
        (i) a top shell,
        (ii) a bottom shell, the top and bottom shells together defining an enclosed area therein sized to receive a recording disk and together forming a front side and a back side, the front and back sides being relatively larger than any other side of the thin box, the enclosed area being defined by a circular bevelled edge to support the recording disk without having the sides of the recording disk contact the inside of the protective disk case, the top and bottom shells being separable at a line of separation so that the front and back sides of the thin box are each separable into two parts, (iii) locking means near one end of the line of separation to lock the top and bottom shells together, and (iv) hinging means near the other end of the line of separation to hingedly connect the top and bottom shells together the protective disk case containing indentures and further comprising a hook having appendages designed to slide and lock into the indentures to allow hanging of the protective disk case from a support rod.

2. A protective disk case, comprising:
a thin box having
(i) a top shell,
(ii) a bottom shell, the top and bottom shells together defining an enclosed area therein sized to receive a recording disk and together forming a front side and a back side, the front and back sides being relatively larger than any other side of the thin box, the enclosed area being defined by a circular bevelled edge to provide 360° support to the recording disc without having the sides of the recording disk contact the inside of the protective disk case, the top and bottom shells being separable at a line of separation so that the front and back sides of the thin box are each separable substantially in half,
(iii) locking means near one end of the line of separation to lock the top and bottom shells together, and
(iv) hinging means near the other end of the line of separation to hingedly connect the top and bottom shells together the protective disk case containing indentures and further comprising a hook having appendages designed to slide and lock into the indentures to allow hanging of the protective disk case from a support rod.

3. A protective disk storage assembly comprising:
(a) a first thin box having
(i) a top shell,
(ii) a bottom shell, the top and bottom shells together defining an enclosed area therein sized to receive a recording disk and together forming a front side and a back side, the front and back sides being relatively larger than any other side of the first thin box, the top and bottom shells being separable at a line of separation so that the front and back sides of the first thin box are each separable into two parts,
(iii) locking means near one end of the line of separation to lock the top and bottom shells together.
(iv) hinging means near the other end of the line of separation to hingedly connect the top and bottom shells together, (b) a second thin box having an open thin side to allow insertion of the first thin box therein, the second thin box designed to closely fit around the first thin box, the second thin box having a connection slot in a thin side thereof and (c) connecting means on the second thin box to allow connection to another second thin box, the connecting means including an insert which is sized to press fit into the connection slot and to outwardly extend therefrom so that the outward extension may be press fitted into a connection slot on another second thin box.

4. The protective disk storage assembly of claim 3, wherein the first thin box has a thin side and the protective disk storage assembly further comprises a handle edge for attaching to the thin side to allow for easy handling of the protective disk storage assembly, the handle wedge including a bar having an elongated slot sized to press fit over the thin side.

5. The protective disk storage assembly of claim 3, wherein the first thin box has an opening in one of the shells near the one end of the line of separation and the locking means includes a locking ball in the other of the shells sized and positioned to press fit into the opening.

6. The protective disk storage assembly of claim 3, wherein the line of separation separates the first thin box substantially in half.

7. The protective disk storage assembly of claim 3, wherein the enclosed area is defined by a circular bevelled edge to support the recording disk without having the sides of the recording disk contact the inside of the protective disk case.

8. A protective disk storage assembly, comprising:
(a) a first thin box having
(i) a rigid top shell,
(ii) a rigid bottom shell, the top and bottom shells together defining an enclosed area therein sized to receive a recording disk and together forming a front side and a back side, the front and back sides being relatively larger than any other side of the first thin box, the enclosed area being defined by a circular bevelled edge to support a recording disk without having the sides of the recording disk contact the inside of the first thin box, the top and bottom shells being separable at a line of separation sos that the front and back sides of the thin box are each separable substantially in half.
(iii) locking means near one end of the line of separation to lock the top and bottom shells together,
(iv) hinging means near the other end of the line of separation to hingedly connect the top and bottom shells together,
(b) a second thin box having an open thin side to allow insertion of the first thin box therein, the second thin box designed to closely fit around the first thin box, the second thin box having a connection slot in a thin side thereof and
(c) connecting means on the second thin box to allow connection to another second thin box, the connecting means including an insert which is sized to press fit into the connection slot and to outwardly extend therefrom so that the outward extension may be press fitted into a connection slot on another second thin box.

* * * * *